(12) United States Patent
Behrens

(10) Patent No.: US 9,266,449 B2
(45) Date of Patent: Feb. 23, 2016

(54) ADJUSTMENT DRIVE OF A MOTOR VEHICLE SEAT

(71) Applicant: Faurecia Autositze GmbH, Stadthagen (DE)

(72) Inventor: Meinhard Behrens, Wiedensahl (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 14/250,858

(22) Filed: Apr. 11, 2014

(65) Prior Publication Data

US 2014/0339874 A1 Nov. 20, 2014

(30) Foreign Application Priority Data

Apr. 12, 2013 (DE) .................... 10 2013 103 694

(51) Int. Cl.
*B60N 2/433* (2006.01)
*B60N 2/42* (2006.01)
*B60N 2/16* (2006.01)

(52) U.S. Cl.
CPC .............. *B60N 2/4249* (2013.01); *B60N 2/165* (2013.01); *B60N 2/1615* (2013.01); *B60N 2/43* (2013.01)

(58) Field of Classification Search
CPC .................................. B60N 2/43; B60N 2/433
See application file for complete search history.

(56) References Cited

U.S. PATENT DOCUMENTS

| | | | | |
|---|---|---|---|---|
| 4,225,177 | A | * | 9/1980 | Kluting ..................... 297/378.11 |
| 4,294,488 | A | * | 10/1981 | Pickles ..................... 297/367 R |
| 6,398,308 | B1 | * | 6/2002 | Becker et al. ............. 297/367 R |
| 7,172,253 | B2 | | 2/2007 | Haverkamp |
| 7,172,255 | B2 | | 2/2007 | Wanke |
| 7,273,243 | B2 | | 9/2007 | Prugarewicz |
| 7,278,689 | B2 | | 10/2007 | Guillouet |
| 7,278,690 | B2 | | 10/2007 | Bej |
| 7,390,059 | B2 | | 6/2008 | Brockschnieder et al. |
| 7,390,063 | B2 | | 6/2008 | Behrens |
| 7,410,219 | B2 | | 8/2008 | Kraft et al. |
| 7,416,254 | B2 | | 8/2008 | Jennings |
| 7,425,038 | B2 | | 9/2008 | Deptolla |
| 7,461,900 | B2 | | 12/2008 | Lange |

(Continued)

FOREIGN PATENT DOCUMENTS

DE 19648974 A1 * 5/1997
DE 10 2007 056 373 A1 5/2009

(Continued)

OTHER PUBLICATIONS

German Office Action dated Feb. 27, 2014 in DE 10 2013 103 694.5 dated Feb. 27, 2014 (4 pages).

*Primary Examiner* — Elizabeth A Plummer
(74) *Attorney, Agent, or Firm* — Shlesinger, Arkwright & Garvey LLP

(57) ABSTRACT

An adjustment drive of a motor vehicle seat is provided, the adjustment drive, having a control pinion. The control pinion, in the event of a collision, is subjected to a torque which acts from the structure of the motor vehicle seat. Overload protection is provided for an adjustment drive of a motor vehicle seat against forces which act in the event of a collision, using a simple device. This is achieved by the control pinion being rigidly connected to a torsion bar, and the control pinion is situated in an extension of the rotational axis of the control pinion, and free end of the torsion bar being integrated into a drive of the control pinion in a rotationally fixed manner.

3 Claims, 2 Drawing Sheets

(56) References Cited

U.S. PATENT DOCUMENTS

| | | |
|---|---|---|
| 7,479,749 B2 | 1/2009 | Gerding et al. |
| 7,490,900 B2 | 2/2009 | Szczudrawa |
| 7,506,939 B2 | 3/2009 | Brockschneider et al. |
| 7,517,022 B2 | 4/2009 | Habedank et al. |
| 7,673,944 B2 | 3/2010 | Behrens |
| 7,746,011 B2 | 6/2010 | Gerding et al. |
| 8,950,782 B2 | 2/2015 | Dobruia et al. |
| 2004/0075404 A1 | 4/2004 | Gerding et al. |
| 2005/0061904 A1* | 3/2005 | Inuzuka et al. ............ 242/379.1 |
| 2006/0055224 A1 | 3/2006 | Wanke |
| 2006/0061184 A1 | 3/2006 | Jennings |
| 2006/0084547 A1* | 4/2006 | Dill et al. ...................... 475/162 |
| 2006/0108491 A1 | 5/2006 | Behrens |
| 2006/0119158 A1 | 6/2006 | Haverkamp |
| 2006/0138817 A1* | 6/2006 | Gorman et al. .......... 297/216.15 |
| 2006/0138842 A1 | 6/2006 | Behrens |
| 2006/0163932 A1 | 7/2006 | Bej |
| 2006/0175887 A1 | 8/2006 | Behrens |
| 2006/0214485 A1 | 9/2006 | Brockschnieder et al. |
| 2006/0237986 A1 | 10/2006 | Brockschneider et al. |
| 2006/0261661 A1 | 11/2006 | Kraft et al. |
| 2006/0290188 A1 | 12/2006 | Guillouet |
| 2007/0013212 A1 | 1/2007 | Meister |
| 2007/0063565 A1 | 3/2007 | Habedank et al. |
| 2007/0069561 A1 | 3/2007 | Schnabel et al. |
| 2007/0096668 A1 | 5/2007 | Gerding et al. |
| 2007/0108824 A1 | 5/2007 | Lange |
| 2007/0126272 A1 | 6/2007 | Deptolla |
| 2007/0222263 A1 | 9/2007 | Szczudrawa |
| 2010/0222174 A1* | 9/2010 | Brehm et al. ................. 475/163 |
| 2011/0298322 A1* | 12/2011 | Sherwin et al. ................ 310/83 |
| 2012/0273319 A1* | 11/2012 | Hur et al. ......................... 192/15 |

FOREIGN PATENT DOCUMENTS

| | | |
|---|---|---|
| DE | WO2013159769 A1 * | 10/2013 |
| EP | 0 806 319 B1 | 9/1998 |
| WO | WO 01/64470 A1 | 9/2001 |

* cited by examiner

ADJUSTMENT DRIVE OF A MOTOR VEHICLE SEAT

CROSS-REFERENCE TO RELATED APPLICATIONS

This application claims the priority of German patent application no. 10 2013 103 694.5, filed Apr. 12, 2013, and which is incorporated herein by reference.

FIELD OF THE INVENTION

The present invention relates to an adjustment drive of a motor vehicle seat.

BACKGROUND OF THE INVENTION

Stringent safety requirements are imposed on adjustment drives of motor vehicle seats, since very high stresses act on the adjustment drives in the event of a collision which may result in undesired seat displacements, thus increasing the risk of injury to vehicle occupants.

To reduce the energy acting on a motor vehicle seat during a collision, it is known to provide targeted deformations of seat structures, for example by the widening of elongated holes, as described in DE 10 2007 056 373 A1.

In addition, it is known to absorb a portion of the mechanical impact energy which acts during a collision by means of elastic and/or plastic deformation of a torsion bar, thus reducing the force of the impact on a seat occupant. Such an approach is described in DE 196 48 974 A1, in which the torsion bar is arranged concentrically in a hollow shaft which connects, for example, two control arms of a seat height adjustment apparatus to one another. The hollow shaft is rigidly connected to the control arms by welding, for example, and is rotatably supported on both sides in a flange which protrudes from an upper rail of a longitudinal seat adjustment apparatus. The torsion bar is supported concentrically in the hollow shaft by two rings which are each situated in the end areas of the hollow shaft. One end of the ring is welded to the hollow shaft and to the torsion bar, while the other end of the ring is welded to the hollow shaft, but not to the torsion bar. The connection between the ring and the torsion bar is established at this end of the hollow shaft by means of a predetermined breaking point. The torsion bar is connected to a height adjustment pump at this end. During normal operation, the torsion bar transmits the torque, which acts on it from the height adjustment pump, to the hollow shaft via the rings, so that the control arms are swiveled and the seat is thus adjusted to the desired height. During a collision, the forces which act on the control arms from the seat are so large that the predetermined breaking point between the ring and the torsion bar breaks, so that the end of the torsion bar facing the height adjustment pump is no longer connected to the hollow shaft. The rigid connection to the hollow shaft is maintained at the other end of the torsion bar. The torsion bar is thus elastically and/or plastically deformed due to the forces which act on the hollow shaft from the control arms, thus reducing the momentum which acts on the vehicle seat from the collision.

A similar approach is described in WO 01/64470 A1, in which a torsion bar is concentrically arranged in a hollow shaft which connects the seat part of a vehicle seat to the seat back of the seat. A coupling nut which is coupled to the hollow shaft rests on the torsion bar in a rotationally fixed manner. The coupling nut divides the torsion bar into two sections which, at their ends, engage with bearings that are formed on the seat part. At least one of the ends of the sections is connected to its bearing in an axially fixed and rotationally fixed manner. In the event of a collision, the torsion bar deforms, so that the force which acts from the seat back is compensated for by conduction into the body. This approach makes it possible to situate the upper anchor of a seat belt on the seat back.

US 2006/0138817 A1 describes an energy absorption system for a motor vehicle seat which likewise has a torsion bar. This torsion bar extends between a first housing plate and a second housing plate, between which swivel joint fittings of the seat back and of the seat part of the motor vehicle seat are accommodated. The first housing plate and the second housing plate have elongated holes which are situated coaxially with respect to one another and which have a first end and a second end. The torsion bar is slidably situated within these elongated holes, and by means of a spring is biased toward each of the first ends of the elongated holes. When a force acts on the torsion bar in the event of a collision, the torsion bar initially moves toward each of the second ends of the elongated holes, against the force of the spring. As a result, energy which acts from the seat back is reduced in the event of a collision. When the torsion bar strikes each of the second ends of the elongated holes of the housing plates, it deforms to further absorb energy.

EP 0 806 319 B1 describes a height adjustment device of a motor vehicle seat. This height adjustment device, as is customary, has two front control arms and two rear control arms which at their respective one end are pivotably fastened to the vehicle floor or to a longitudinal seat adjustment apparatus of the motor vehicle seat, and at their respective other end are pivotably connected to the seat part of the motor vehicle seat. The drive of the height adjustment device is achieved via one of the control arms. For this purpose, this control arm has a toothed cutout with external toothing. A pinion which is driven manually or by an electric motor via a step-down gear meshes with this toothing. The seat is held in a set height position by an apparatus which blocks the rotation of the pinion. In the event of a collision, the forces which act are absorbed by the blocking apparatus of the pinion. These forces generate a torque on the pinion. To avoid a resulting unwanted rotation of the pinion, the elements which ensure the blocking of the pinion must be oversized with respect to the forces which act during normal use of the elements. This results in higher weight, greater installation space requirements, and lastly, higher costs.

To avoid these disadvantages, the approach according to EP 0 806 319 B1 is directed toward not transmitting the forces acting during the collision to the blocking apparatus of the pinion. As a result, the blocking apparatus may be dimensioned for the forces which act during normal operation of the height adjustment device. For this purpose, it is proposed to provide the driven control arm with a two-part design, with its two parts connected to one another via a predetermined breaking point and a rotational axis. Both parts have a toothed cutout with external toothing which is designed as primary toothing with which the pinion meshes. In parallel to this primary toothing and at a distance therefrom, the cutouts have secondary toothing with which the pinion does not engage during normal operation.

During normal operation, the cutouts of the two parts of the control arm are superimposed one above the other; i.e., the pinion meshes simultaneously with the primary toothing of both parts. If forces which act in the event of a collision exceed a certain threshold value, the predetermined breaking point breaks, and the two parts of the control arm may be adjusted with respect to one another about the rotational axis.

Due to this adjustment, the pinion engages with the primary toothing of one part of the control arm, and engages with the secondary toothing of the other part of the control arm; i.e., the pinion is blocked against rotation due to the engagement with these two diametrically opposed toothings, so that the force absorbed by the control arm is delivered directly to the chassis via the pinion and the two parts of the control arm without a torque being transmitted to the blocking apparatus, i.e., to the drive apparatus of the pinion. This design is complicated.

OBJECTS AND SUMMARY OF THE INVENTION

An object of the present invention is to provide overload protection for an adjustment drive of a motor vehicle seat against forces which act in the event of a collision, using a simple device.

This object is achieved according to the invention with an adjustment drive of a motor vehicle seat as set forth herein.

This object is further achieved by an adjustment drive of a motor vehicle seat, having a control pinion which in the event of a collision is subjected to a torque which acts from the structure of the motor vehicle seat, and the control pinion is rigidly connected to a torsion bar situated in an extension of the rotational axis of the control pinion, and the free end of the torsion bar being integrated into a drive of the control pinion in a rotationally fixed manner.

Due to the approach according to the invention, the energy reduction as the result of a collision takes place not only in the supporting structure of the motor vehicle seat, but also in the adjustment drive. If excessively high stress acts on the structure of the motor vehicle seat due to a collision, this results in rotation of the control pinion. This introduced energy is converted into deformation energy of the torsion bar connected to the control pinion. The energy reduction may thus be controlled in a targeted manner via the diameter of the torsion bar.

The invention includes an adjustment drive of a motor vehicle seat, having:
  a) a control pinion which in the event of a collision is subjected to a torque which acts from the structure of the motor vehicle seat;
  b) the control pinion being rigidly connected to a torsion bar situated in an extension of the rotational axis of the control pinion; and
  c) a free end of the torsion bar being integrated into a drive of the control pinion in a rotationally fixed manner.

Further advantageous embodiments of the invention are as set forth in the claims and as detailed herein.

Relative terms, such as left, right, up and down are for convenience only and are not intended to be limiting.

The invention is explained in greater detail below with reference to an embodiment. The associated drawings show the following:

DETAILED DESCRIPTION OF THE INVENTION

The invention is described below with reference to an embodiment of a seat height adjustment apparatus, but is not limited to such an adjustment drive, and other adjustment drives of a motor vehicle seat having a control pinion may also be used.

Figure 1:
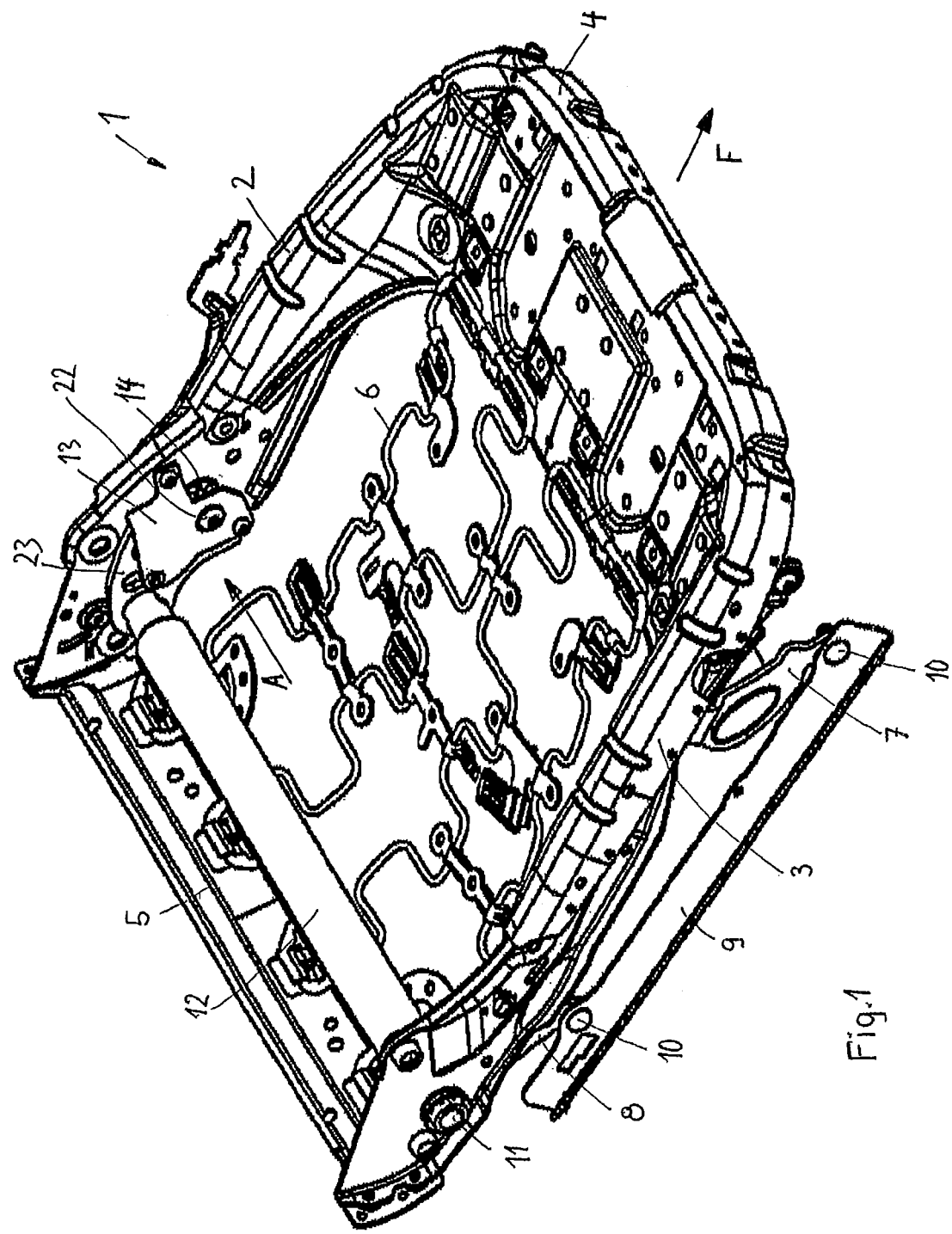
FIG. 1 shows a perspective view, diagonally from the front, of the supporting structure of a seat part of a motor vehicle seat.

FIG. 1 shows the supporting structure of a seat part 1 of a motor vehicle seat, otherwise not illustrated in greater detail. The seat part 1 has a circumferential frame with two side parts 2, 3 which are connected to one another via a front crossbeam 4 and a rear crossbeam 5. A spring mat 6 which is used to support padding, not illustrated, is suspended in the front crossbeam 4 and the rear crossbeam 5.

Seat part 1 is supported on both sides on a bearing flange 9 via the front control arm 7 and the rear control arm 8. The bearing flange 9 may be connected to an upper rail of a longitudinal seat adjustment apparatus, or to the vehicle floor in some other manner.

The two front control arms 7 and the two rear control arms 8 are part of a seat height adjustment apparatus, and are pivotably connected to the bearing flanges 9 via lower pivot points 10. These articulated connections are visible on only one side of the seat part due to the graphical illustration selected. In addition, the front control arms 7 and the rear control arms 8 have upper pivot points 11 together with the seat part 1, of which only the upper pivot point 11 of the right rear control arm 8, viewed in the direction of travel (FIG. 1, arrow F), is visible due to the graphical illustration selected. The pivot points 11 result due to the fact that the upper end of the rear control arms 8 in each case rests in a pivotable manner on a transverse tube 12 which extends between the two side parts 2 and 3 of the seat part 1.

Figure 3:
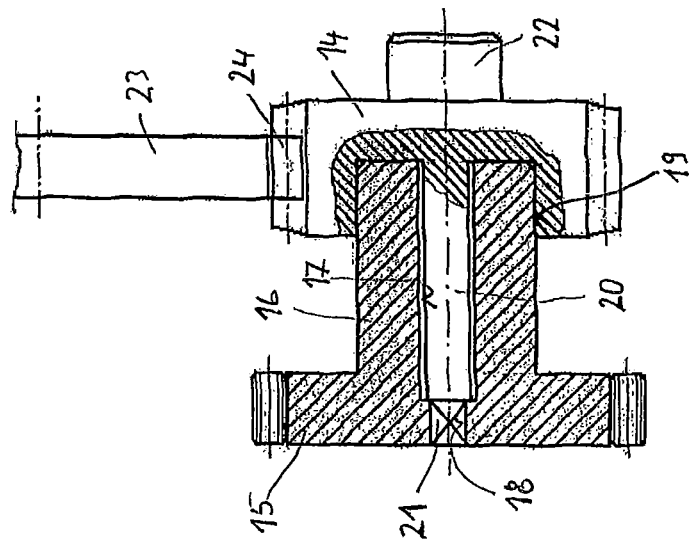
FIG. 3 shows a partial sectional illustration of the control pinion according to the invention, which is integrated into the output side of a height adjustment pump.
Figure 2:
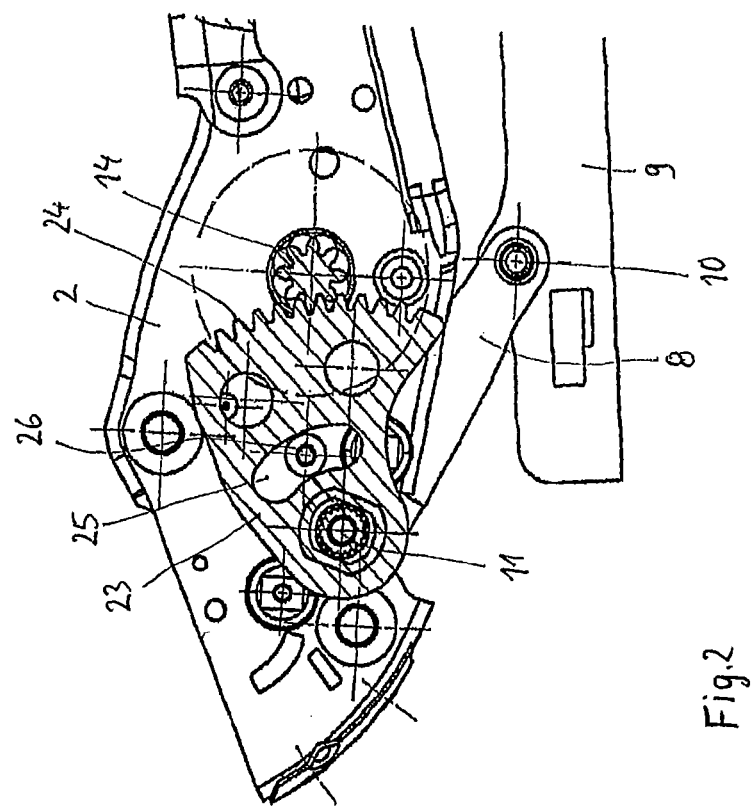
FIG. 2 shows a view, in the direction of the arrow A according to FIG. 1, of an inner region of the seat part in an enlarged illustration.

The drive of the seat height adjustment apparatus is achieved via the rear control arm 8, viewed in the direction of travel (arrow F), and is explained in greater detail below with reference to FIGS. 2 and 3. The region of the seat part 1 of interest here is partially covered by an end shield 13 in FIG. 1, which has been omitted in the illustration according to FIG. 2 in order to make the relevant components visible.

A height adjustment pump, which is situated on the exterior of the side part 2 and is not visible in the graphical illustration, is provided for the seat height adjustment apparatus. Height adjustment pumps of this type are known from the prior art, and therefore require no further explanation for understanding of the present invention. The drive of the height adjustment pump is provided manually or by an electric motor.

A control pinion 14 is connected to the output side of the height adjustment pump. The only part of the height adjustment pump that is illustrated in FIG. 3 is an output-side pinion 15. The output-side pinion has a cylindrical axle stub 16 with a central cylindrical borehole 17 which merges into a square hole 18. The axle stub 16 of the pinion 15 passes through the side part 2 of the seat part 1 from the outside to the inside, so that the end of the axle stub protrudes slightly from the interior of the side part 2. The control pinion 14 rests on this protruding end of the axle stub 16 with slight radial play, and for this purpose has a bore 19 that is adapted to the outer diameter of the axle stub 16. In addition, the control pinion 14 has a torsion bar 20 in the form of a central journal having a circular cross section. This torsion bar 20 has an outer diameter which is slightly smaller than the inner diameter of the borehole 17 of the pinion 15. The torsion bar 20 ends in a square 21.

During assembly of the control pinion 14, the torsion bar 20 is inserted into the borehole 17 of the pinion 15 and turned so that the square 21 of the torsion bar is able to submerge into the square hole 18 of the pinion 15. When this insertion motion is complete, the control pinion 14 rests with its bore 19 on the axle stub 16, as illustrated in FIG. 3. Due to the seating of the square 21 in the square hole 18, the control pinion 14 is connected to the pinion 15 of the height adjustment pump in a rotationally fixed manner. This rotationally fixed connection is configured in such a way that it withstands the forces and torques that act during normal operation of the height adjustment device. On its side facing away from the pinion 15 in the installed position, the control pinion 14 has a cylindrical bearing journal 22 which is supported in the end shield 13.

The adjustment drive also includes a toothed segment 23 which is connected to the transverse tube 12 in a rotationally fixed manner. The toothed segment 23 has external toothing 24 which is situated on a circular arc about the pivot point 11. The control pinion 14 meshes with this external toothing 24. For adjusting the height of the seat part 1, the control pinion 14 is driven in one direction or the other, so that the seat part 1 is raised or lowered. The front control arms 7 which are not driven and the right rear control arm 8 are carried along via the rigid seat part 1. To limit the swivel motion of the toothed segment 23 in both directions, the toothed segment is provided with an elongated hole 25 that is situated on a circular arc about the pivot point 11. Stop pins 26 which are rigidly connected to the side part 2 pass through this elongated hole 25, and the contact of the stop pins with the ends of the elongated hole 25 limits the swivel motion of the toothed segment 23.

As stated above, the output-side pinion 15 of the height adjustment pump and the control pinion 14 form a rotationally fixed connection which reliably transmits the forces and torques which act during height adjustment of the seat part 1. In the event of a collision, however, larger forces and torques act on the supporting structure of the motor vehicle seat, and they are transmitted to the control pinion 14 via the toothed segment 23. This increased stress is compensated for due to the fact that the control pinion 14 is able to rotate on the axle stub 16 of the pinion 15 with twisting of its torsion bar 20. The plastic and/or elastic deformation of the torsion bar 20 results in energy reduction, so that other structures of the seat are protected from deformation or excessively high deformation.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Adjustment drive of a motor vehicle seat, comprising:
   a) a control pinion, which in the event of a collision, is subjected to a torque which acts from a structure of the motor vehicle seat;
   b) the control pinion resting via a bore on an axle stub of an output-side pinion of the drive, and the control pinion having a torsion bar in the form of a central journal having a circular cross section which is smaller than an inner diameter of a central cylindrical borehole of the output-side pinion, while a free end of the torsion bar when inserted into the central cylindrical borehole of the output-side pinion in an installed state is connected with the output-side pinion in a rotationally fixed manner such that the control pinion is able to rotate on the axle stub of the output-side pinion with twisting of the torsion bar of the control pinion in the event of a collision.

2. Adjustment drive according to claim 1, wherein:
   a) the central cylindrical borehole merges into a square hole.

3. Adjustment drive according to claim 2, wherein:
   a) the circular cross section of the torsion bar at the torsion bar's free end transitions into a square; and,
   b) in the installed state the torsion bar rests concentrically in the central cylindrical borehole, with the square of the torsion bar engaging with the square hole in a form-fit manner.

* * * * *